United States Patent
Ramous

(10) Patent No.: US 10,801,185 B2
(45) Date of Patent: Oct. 13, 2020

(54) FLUID LINE GUARD

(71) Applicant: Jason Ramous, Murrells Inlet, SC (US)

(72) Inventor: Jason Ramous, Murrells Inlet, SC (US)

( * ) Notice: Subject to any disclaimer, the term of this patent is extended or adjusted under 35 U.S.C. 154(b) by 309 days.

(21) Appl. No.: 15/915,919

(22) Filed: Mar. 8, 2018

(65) Prior Publication Data

US 2019/0277007 A1    Sep. 12, 2019

(51) Int. Cl.
| | | |
|---|---|---|
| E02F 9/22 | (2006.01) |
| F16L 57/00 | (2006.01) |
| F16L 3/02 | (2006.01) |
| F16L 3/12 | (2006.01) |

(52) U.S. Cl.
CPC ............ *E02F 9/2275* (2013.01); *E02F 9/226* (2013.01); *F16L 3/02* (2013.01); *F16L 3/12* (2013.01); *F16L 57/00* (2013.01)

(58) Field of Classification Search
CPC . E02F 9/226; E02F 9/2275; F16L 3/01; F16L 3/02; F16L 3/04; F16L 3/06; F16L 3/08; F16L 3/12; F16L 3/123; F16L 3/16; F16L 3/20; F16L 3/26; F16L 23/003; F16L 35/00; F16L 57/00; F16L 59/168
See application file for complete search history.

(56) References Cited

U.S. PATENT DOCUMENTS

| | | | | |
|---|---|---|---|---|
| 5,232,330 A | * | 8/1993 | Rae | E02F 3/6273 |
| | | | | 414/686 |
| 6,171,050 B1 | * | 1/2001 | Johnson | E02F 3/34 |
| | | | | 414/685 |
| 2013/0313374 A1 | * | 11/2013 | Magno, Jr. | F16L 3/04 |
| | | | | 248/49 |
| 2015/0337992 A1 | * | 11/2015 | McCarter | F16L 3/22 |
| | | | | 52/173.1 |
| 2019/0169821 A1 | * | 6/2019 | Lewis | E02F 9/2275 |
| 2019/0193997 A1 | * | 6/2019 | Udd | B66C 3/005 |

\* cited by examiner

*Primary Examiner* — Prasad V Gokhale
(74) *Attorney, Agent, or Firm* — Cafardi, Ferguson, Wyrick, Weis & Gabriel, LLC; Andrew M. Gabriel

(57) ABSTRACT

An embodiment provides a hydraulic fluid line guard, including: a main guard formed with an open bottom and enclosed top and sides; the main guard having a length dimension that is larger than a width dimension; and an arm attached to the main guard; the arm comprising an attachment mechanism that attaches the main guard about a hydraulic fluid line such that a detachable junction point of the hydraulic fluid line is housed within and under the main guard and is accessible from below. Other embodiments are described and claimed.

8 Claims, 7 Drawing Sheets

FLUID LINE GUARD

BACKGROUND

Fluid lines such as pressurized hydraulic fluid lines on heavy machinery use pressurized fluid delivery to accomplish a task, such as moving a part of the machinery. Often the fluid is placed under extreme pressure to accomplish the task. Even when the fluid line is not in use, e.g., is subject to service or repair, the fluid within the line remains pressurized.

BRIEF SUMMARY

In summary, one embodiment provides a hydraulic fluid line guard, comprising: a main guard formed with an open bottom and enclosed top and sides such that the main guard forms a U shape; the main guard having a length dimension that is larger than a width dimension; and an arm attached to the top of the main guard and extending beyond a lateral end of the main guard; the arm terminating with a support end that comprises one or more apertures housing one or more shafts therein; the one or more shafts extending downward and attaching to a movable clamp part that has one or more apertures therein for accommodating the one or more shafts therein; wherein the support end of the arm, the one or more shafts, and the movable clamp part form an attachment mechanism that attaches the main guard about a hydraulic fluid line such that a detachable junction point of the hydraulic fluid line is housed within and under the main guard and is accessible from below.

Another embodiment provides a hydraulic fluid line guard, comprising: a main guard formed with an open bottom and enclosed top and sides; the main guard having a length dimension that is larger than a width dimension; and an arm attached to the main guard; the arm comprising an attachment mechanism that attaches the main guard about a hydraulic fluid line such that a detachable junction point of the hydraulic fluid line is housed within and under the main guard and is accessible from below.

A further embodiment provides a vehicle, comprising: an articulating arm that is driven by a hydraulic fluid line; a main guard formed with an open bottom and enclosed top and sides; and an attachment mechanism that attaches the main guard about the hydraulic fluid line such that a detachable junction point of the hydraulic fluid line is housed within and under the main guard and accessible from below.

The foregoing is a summary and thus may contain simplifications, generalizations, and omissions of detail; consequently, those skilled in the art will appreciate that the summary is illustrative only and is not intended to be in any way limiting.

For a better understanding of the claimed embodiments, reference is made to the following description and the accompanying drawings.

DETAILED DESCRIPTION

Figure 1:
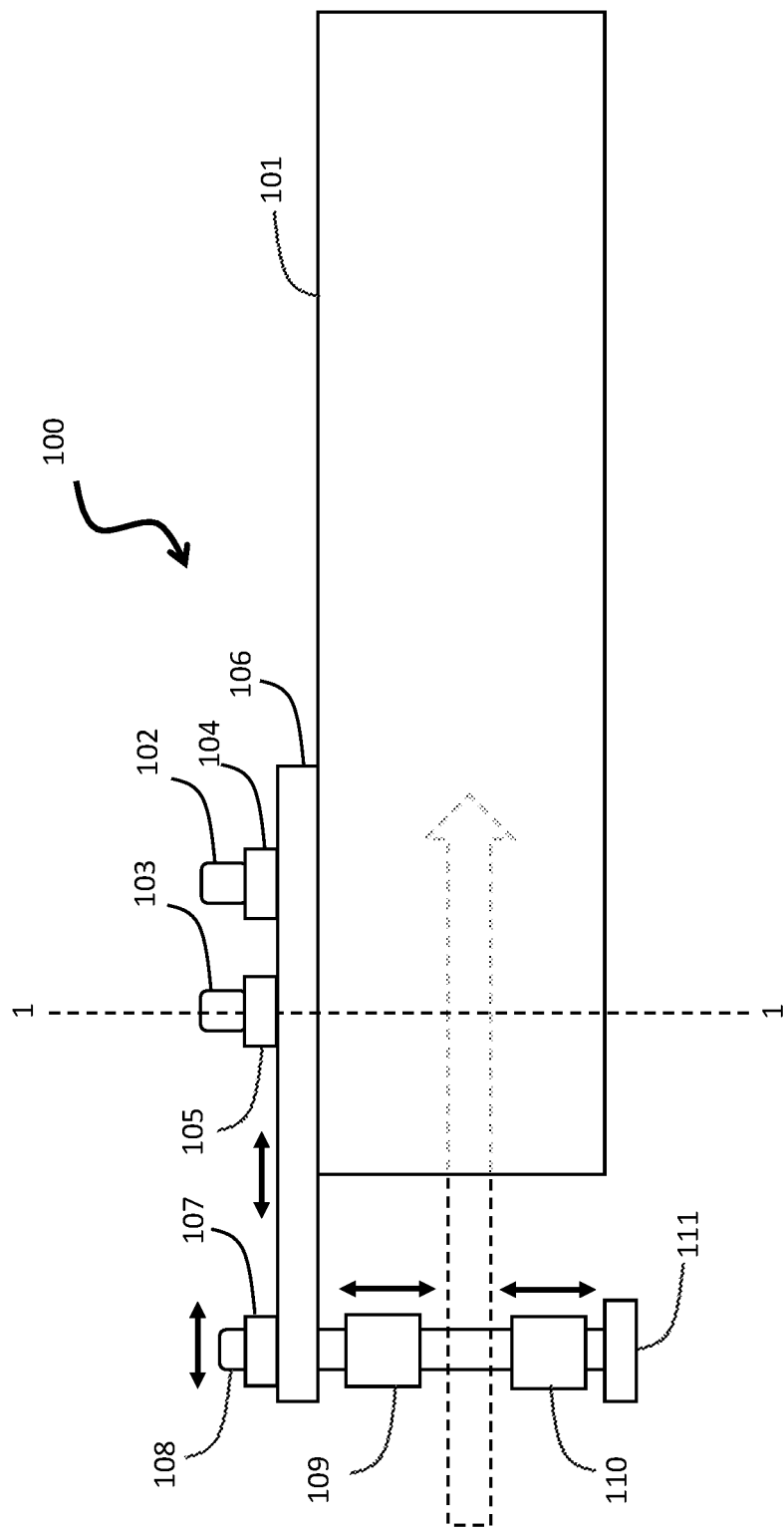
FIG. 1 illustrates a side view of an example fluid line guard.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the claims, but is merely representative of those embodiments.

Reference throughout this specification to "embodiment (s)" (or the like) means that a feature, structure, or characteristic described in connection with the embodiment is included in at least one embodiment, which may or may not be claimed. Thus, appearances of the phrases "according to embodiments" or "an embodiment" (or the like) in various places throughout this specification are not necessarily all referring to the same embodiment.

Furthermore, the described features, structures, or characteristics may be combined in any suitable manner in one or more embodiments. In the following description, numerous specific details are provided to give a thorough understanding of example embodiments. One skilled in the relevant art will recognize, however, that aspects can be practiced without one or more of the specific details, or with other methods, components, materials, etc. In other instances, well-known structures, materials, or operations are not shown or described in detail to avoid obfuscation.

Fluid lines such as pressurized hydraulic fluid lines on heavy machinery require maintenance and repair. Commonly the hydraulic fluid in the lines is pressurized even when the fluid line is not in use. This leads to a problem in that, when a fluid line needs to be disconnected, e.g., at a junction point, pressurized hydraulic fluid sprays the surrounding area until the pressure is normalized. A common technique used to address this problem is placement of a rag around the junction point in an effort to control the spray of hydraulic fluid. However, this technique is often ineffective and leads to a large area being sprayed by pressurized hydraulic fluid, including the mechanic or technician performing the service.

Accordingly, an embodiment includes a fluid line guard, which may be used to control the spray of hydraulic fluid (or other fluids such as water). In an embodiment, the fluid line guard is attached to the fluid line or another local support structure such that a main guard of the fluid line guard houses the joint area of the line within it. This permits the spray of hydraulic fluid (or other fluid) to be controlled and the surrounding environment spared from being sprayed with fluid.

In one embodiment, the fluid line guard is a detachable or removable guard that can be fitted onto a fluid line as needed, e.g., when a hydraulic line is to be serviced. In another embodiment, the fluid guard may form a permanent or semi-permanent part of a vehicle, e.g., a fluid line guard that is supplied at the time of manufacture and left in place. The guard is open on one side, e.g., the bottom, allowing a mechanic or technician to reach the fluid line while the guard is attached thereto or otherwise fixed in place.

The description now turns to the figures. The illustrated example embodiments will be best understood by reference to the figures. The following description is intended only by way of example and simply illustrates certain selected example embodiments.

Throughout this description, a fluid line guard will be described in connection with a hydraulic fluid line guard that is suitable for use with heavy equipment such as front-end loaders. However, as will be clear from review of this disclosure, other fluid line guards may be employed in other contexts, e.g., as guards for water lines in plumbing applications, etc. Applicant reserves the right to pursue claims to any of the embodiments supported by this disclosure in this application and/or in one or more divisional or continuation applications.

As illustrated in FIG. 1, a side view of an example hydraulic fluid guard 100 is shown. The hydraulic fluid guard 100 includes a main guard 101 or shielding part that is placed over a joint of a hydraulic fluid line (not illustrated in FIG. 1) to be disconnected. The main guard 101 may take a variety of forms. In one example, the main guard 100 is formed as an open rectangle or curved guard, each of which includes an open bottom, a top, and two sides. The shape of the main guard 101 is referred to herein as generally "U" shaped, i.e., it has an open side or area for accessing the hydraulic line for disconnection. In the context of this document, a U shape is considered to include any shape that forms a suitable fluid guard main part with access to the fluid line for detachment.

As illustrated in the example of FIG. 1, at a top part or side of the main guard 101 an arm 106 is attached, e.g., via two studs 102, 103, which may be secured by two nuts 104, 105 or like arrangement, e.g., welded into place. In an embodiment, the arm 106 and the main guard 101 may be integral, e.g., formed by molding or casting in the case of a metallic fluid guard 100.

The arm 106 extends over a lateral end of the main guard 101 and includes apertures for accommodating one or more shafts 108, which may take the form of a bolt that is secured to the arm 106 via a nut 107. The shaft 108 supports one or more clamp parts 109, 110, which may be used to secure the fluid guard 100 to a hydraulic fluid line, as further described herein. In the case of using a bolt 108, the head 111 of the bolt may be positioned below the lower clamp part 110 (which may be the only clamp part used, i.e., clamp part 109 may be omitted).

As shown in the side view of FIG. 1, the hydraulic fluid line may be secured by one or more clamp parts 109, 110 of the arm 106 such that a joint of the fluid line is secured within the main guard 101. This is illustrated in FIG. 1 by the dashed arrow, showing how the hydraulic fluid line may be positioned in the clamp. The clamp may be affixed to the hydraulic fluid line by removing the bolt 108 and one or more clamp parts 109, 110 from the arm 106 and placing the lower clamp part 110 beneath the hydraulic fluid line and reattaching the bolt 108 to the terminal part of the arm, e.g., using nut 107 or like arrangement. The claim parts 109, 110 are movable about bolts or shafts 108, as indicated by the arrows in FIG. 1. In addition, the bolt or shaft 108 may be moved within the arm 106 or the arm 106 itself may be moved with respect to the main guard 101, as indicated by the arrows in FIG. 1. This permits the main guard 101 to be positioned appropriately about the joint or connection of the hydraulic fluid line.

Figure 2:
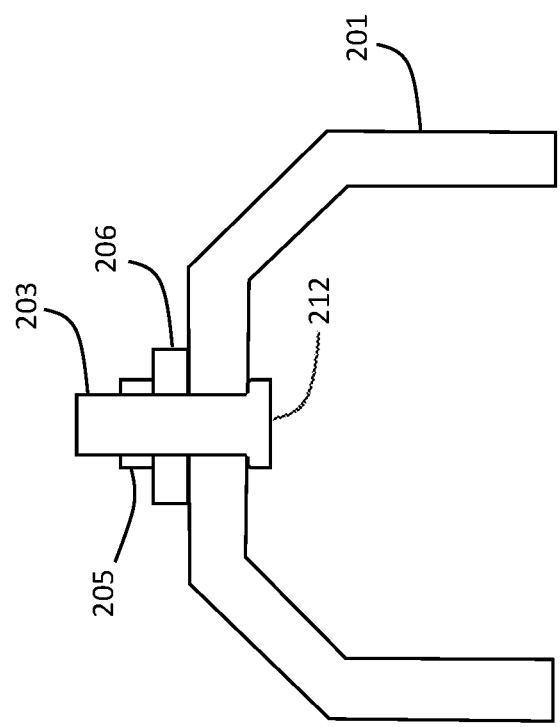
FIG. 2 illustrates a cross-sectional view at section 1:1 of FIG. 1.

In FIG. 2 a cross-section view along cross section 1:1 of FIG. 1 is illustrated. This view permits appreciation of the generally U shape (which is an inverted U in this orientation) of the main guard 201. As shown, stud 203, which may take the form of a bolt or like element, is used to secure the arm 206 to the main guard 201, for example using a nut 205. In the case of using a bolt as stud 203, the head 212 secures the stud 203 to the main guard 201. As shown, the top (where the arm 206 is attached) and sides of the main guard 201 act to shield the surrounding environment from spraying hydraulic fluid, with the bottom being open so that a mechanic or technician can access the hydraulic fluid line, as further described herein.

Figure 3:
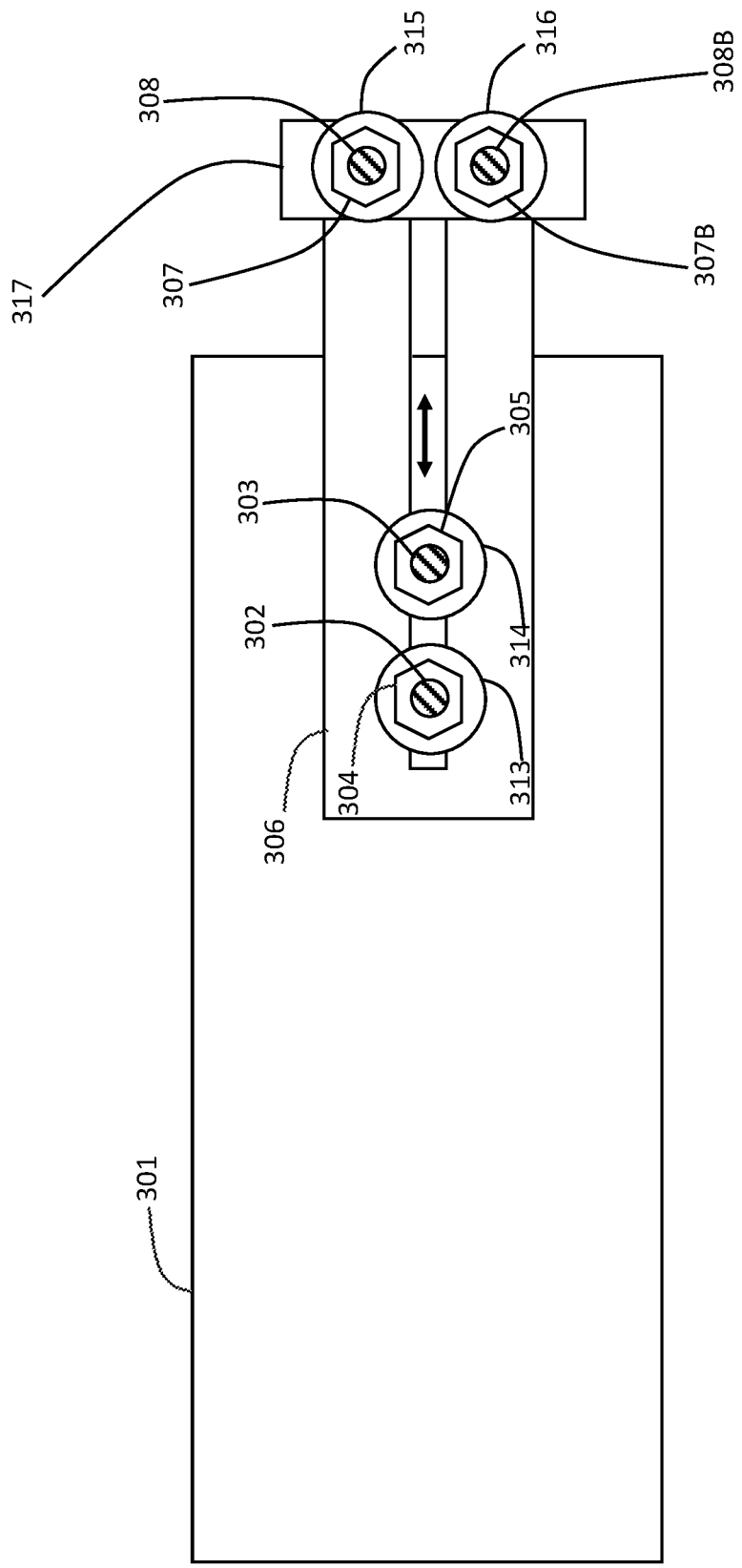
FIG. 3 illustrates a top view of an example fluid line guard.

FIG. 3 is a top view of an example fluid guard. Here, the arm 306 is positioned on the right side with respect to the main guard 301. As illustrated, the arm 306 includes a mechanism, in this example in the form of a channel (having two-sided arrow therein), in which studs or bolts 302, 303 can be released via nuts 304, 305 and washers 313, 314, permitting repositioning of arm 306 with respect to the main guard 301. Such repositioning may be required to position the terminal or support end of the arm 317 appropriately.

Also illustrated in FIG. 3 are shafts or bolts 308, 308b, which are secured to the support or terminal end of the arm 317 via nuts 307, 307b and washers 315, 316. The shafts or bolts 308, 308b are removable from the support end of arm 317, for example to secure a hydraulic fluid line with the clamp mechanism, as described in connection with FIG. 2.

Figure 4:
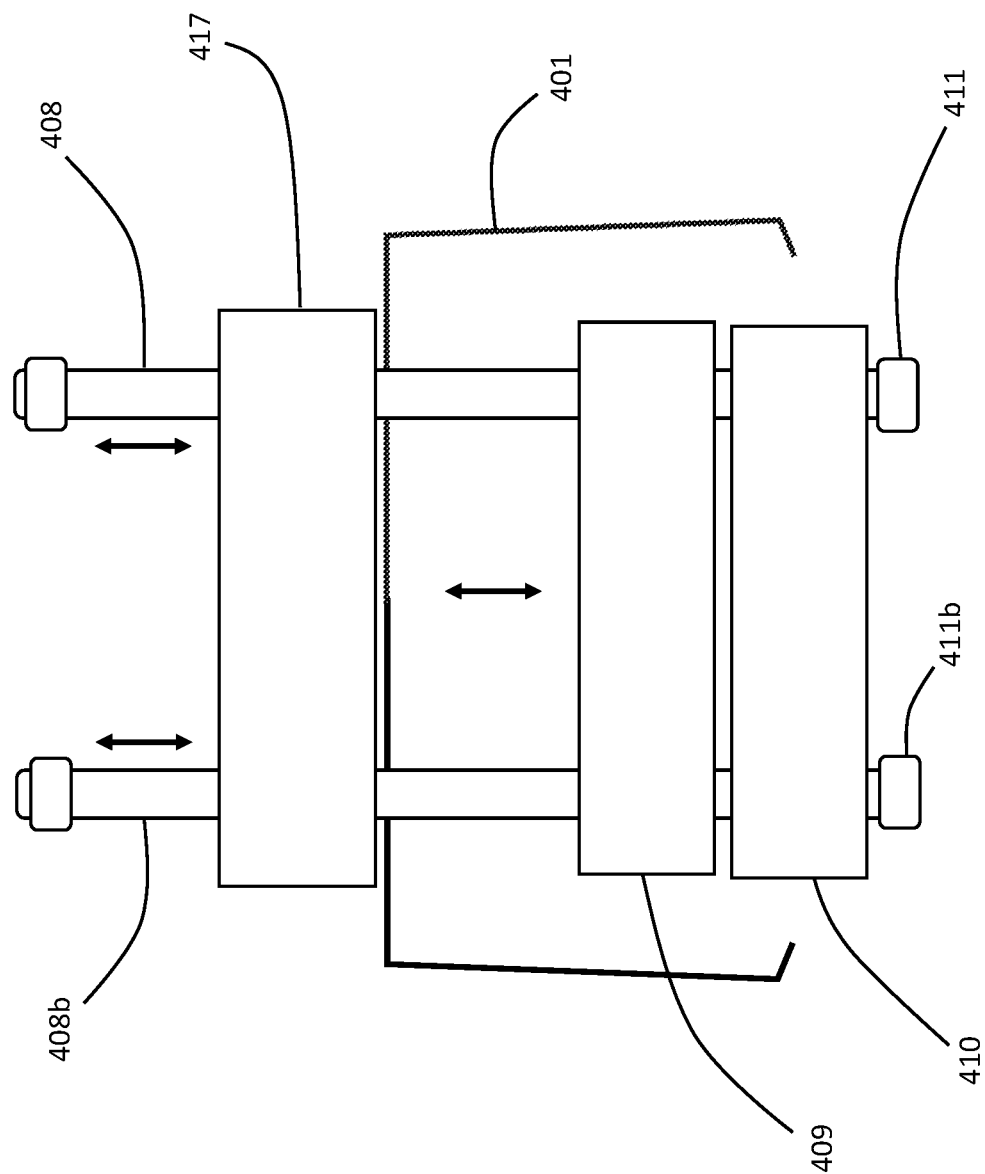
FIG. 4 illustrates an end view of an example fluid line guard.

An end of the fluid guard (clamp end) is illustrated in FIG. 4, which forms an attachment mechanism of one embodiment. As illustrated, shafts or bolts 408, 408b traverse through support or terminal end of arm 417 as well as through one or more clamp parts 409, 410, which are secured in place by heads 411, 411b. Each part is movable with respect to the bolts or shafts 408, 408b, i.e., the attachment mechanism may be disassembled and clamp parts 409, 410 repositioned about a hydraulic fluid line such that it can be positioned within and underneath main guard 401.

Figure 5:
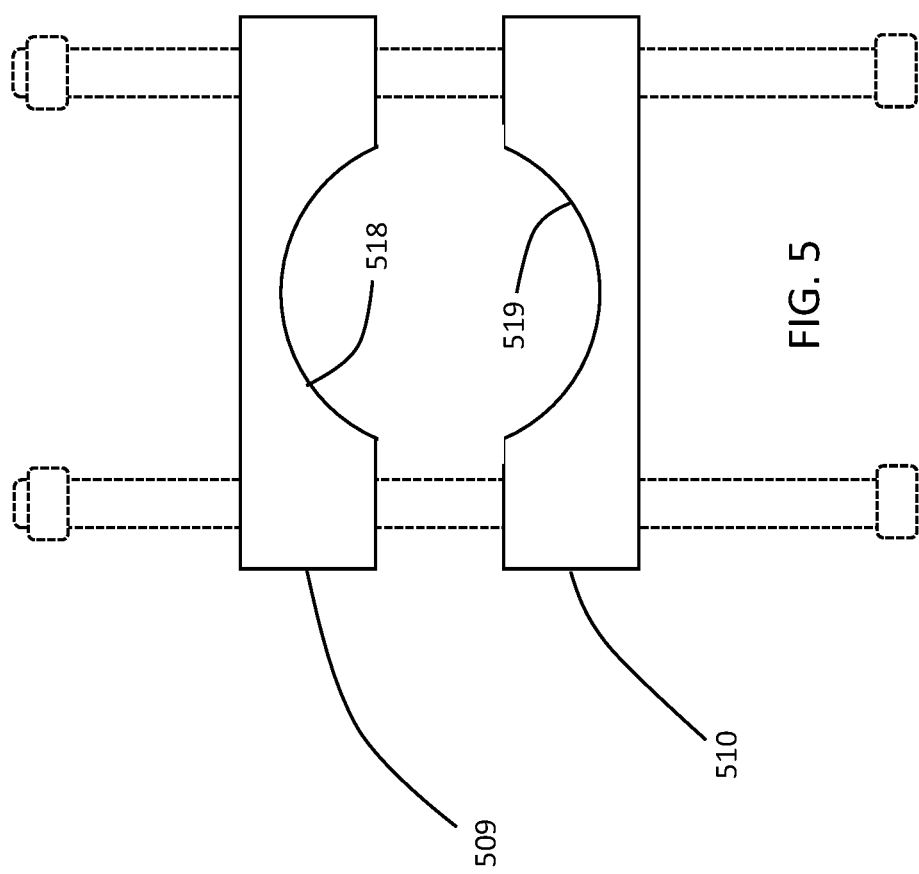
FIG. 5 illustrates an example of a clamp of a fluid line guard.

The fluid guard may include a variety of attachment mechanisms. As shown in FIG. 5, the clamp parts 509, 510 can include curved surfaces 518, 519, e.g., to accommodate the curvature of a hydraulic line, fitting, or other fluid conduit. As described herein, one or more clamp parts may be omitted, and the fluid guard may be attached to the fluid line or to a support structure, such as a surrounding vehicle part, without departing from the scope and spirit of this disclosure.

For example, in an embodiment, the arm and clamp part(s) may be omitted and the fluid guard attached directly to the fluid line, e.g., via slot(s) on the ends of the main guard part, (normally left open as illustrated in FIG. 2), fitting to and securing to the fluid line. In an embodiment, the fluid guard may comprise only the main guard part, with slot(s) or other attachment mechanisms (e.g., spring loaded parts) attaching to the fluid line directly, and/or without such slots or attachment mechanisms, i.e., being fixed into place by attachment to a surrounding component, e.g., a vehicle arm part, bracket, etc.

Figure 6:
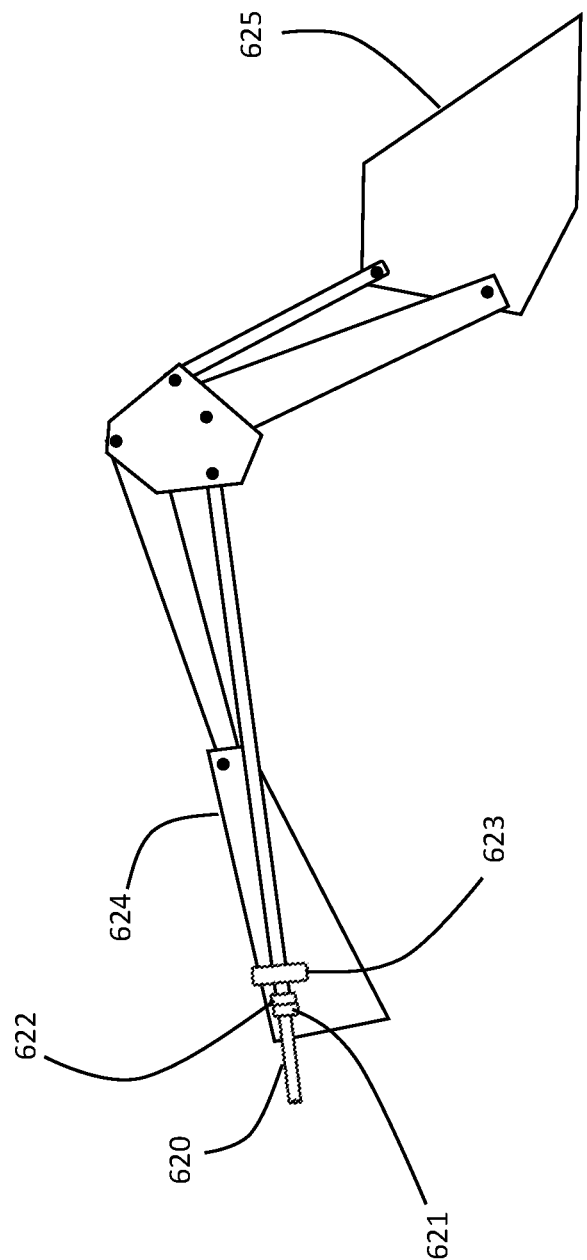
FIG. 6 illustrates an example location for attaching a fluid line guard in association with an articulating arm of a vehicle.

In an embodiment, the fluid guard may be used in connection with hydraulic lines for vehicles. Shown in FIG. 6 is an example articulating arm of a vehicle, to which or on which a fluid guard may be attached. In the example of FIG. 6, a hydraulic line 620 includes hydraulic fluid for moving parts of the articulated arm. In this example, the hydraulic line 620 moves a bucket 625, and may be used to move other parts of the articulated arm. Hydraulic line 620 is attached to the articulating arm part 624 via a bracket 623. Fittings or collars 621, 622 secure parts of the hydraulic line 620, i.e., form a junction that allows one part of the hydraulic line 620 to be attached to and removed from another part thereof. When the junction is opened or broken, pressurized hydraulic fluid sprays from the hydraulic line 620 in the area of fittings 621, 622.

Figure 7:
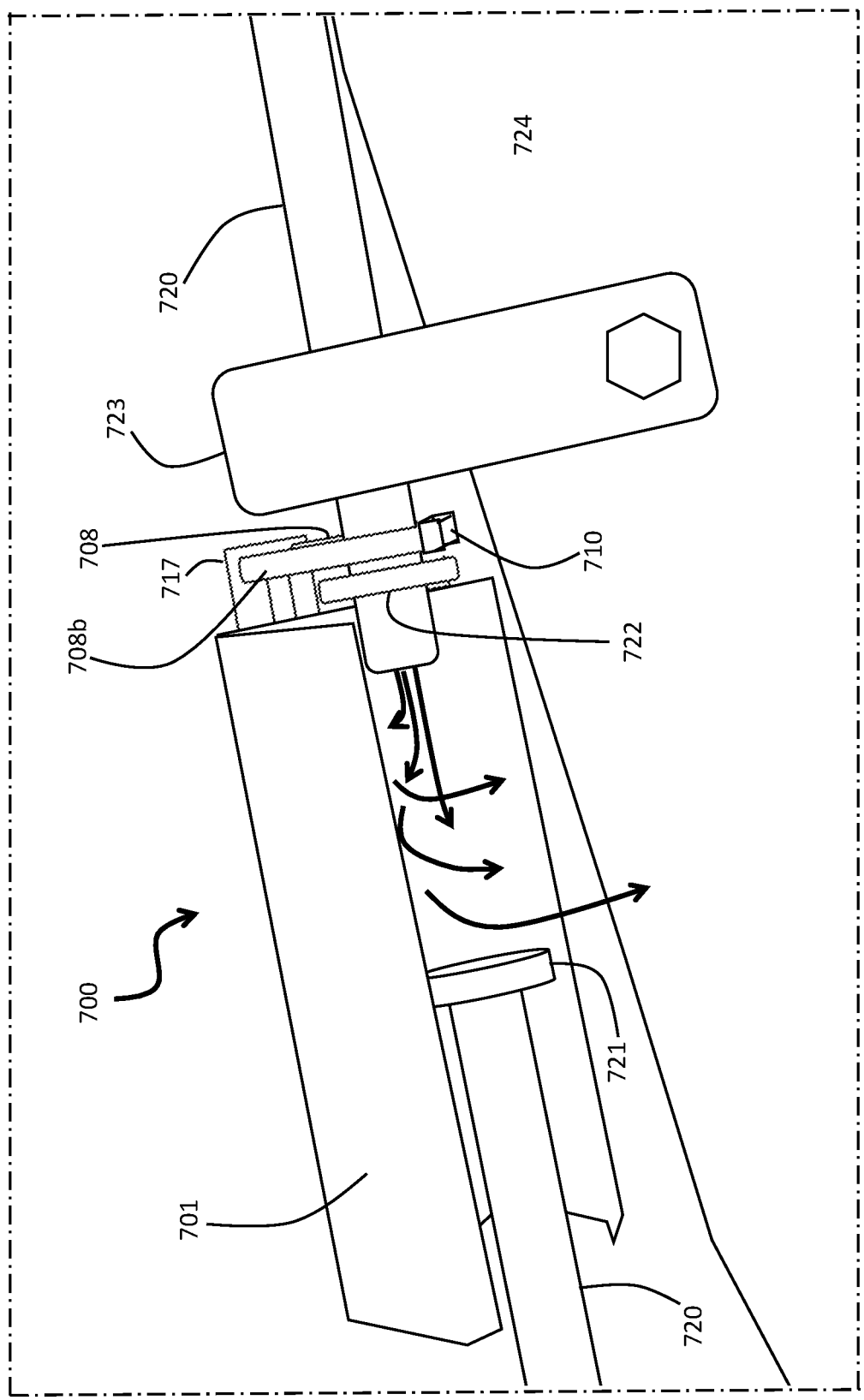
FIG. 7 illustrates an example fluid line guard attached to a hydraulic line of an articulating arm of a vehicle.

Referring to FIG. 7, a lower perspective view is shown of a fluid guard 700 attached to the hydraulic line 720, which is in turn attached to articulating arm part 724 via a bracket 723. As shown, the lower clamp part 710 is fitted below the hydraulic line proximate to collar or fitting 722. This traps hydraulic line 720 between shafts or bolts 708, 708b, lower clamp part 710, and the support part 717 of the arm. As such, the joint part of the hydraulic line 720 is positioned within main guard 101. When a mechanic or technician, which can access hydraulic line 720 via the open part of the main guard 101, disconnects fittings 721, 722 from one another, hydraulic fluid spray from the hydraulic line 720 is controlled into a downward flow, as shown by the arrows indicated in FIG. 7. This prevents uncontrolled spray of pressurized hydraulic fluid.

Accordingly, an embodiment provides a fluid guard that may be attached to a fluid line in a releasable fashion, or may be formed as part of a vehicle, e.g., attached permanently or semi-permanently to an articulating arm of a piece of heavy machinery such as a font end loader. This guard controls the spray of fluid, such as pressurized hydraulic fluid, during disconnect and repair of pressurized fluid lines.

The size of the fluid guard or parts thereof may be chosen as appropriate. In one example embodiment, the fluid guard is about six inches in height, about four and three quarters inches in width (e.g., the lower opening is about four and three-quarters inches), and about twelve inches long (i.e., extends along the fluid line for about twelve inches). Other sizes, however, may be chosen, e.g., for a plumbing application or for smaller vehicle types.

The materials utilized in one or more embodiments may vary depending on the implementation or like considerations. In one embodiment, for example, a metal fluid guard, including a metal main guard, may be provided, e.g., for strength. In another example, a transparent or semitransparent material, such as a clear plastic or polymer, may be chosen for part or all of the fluid guard, e.g., main guard part. This permits a technician or mechanic to see the fluid line beneath the guard, if required or desirable.

It is worth noting that while specific elements are used in the figures, and a particular ordering of elements has been illustrated, these are non-limiting examples. In certain contexts, two or more elements may be combined, an element may be split into two or more elements, or certain elements may be re-ordered or re-organized or omitted as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A hydraulic fluid line guard, comprising:
a main guard formed with an open bottom and enclosed top and sides;
the main guard having a length dimension that is larger than a width dimension; and
an arm attached to the main guard;
the arm comprising an attachment mechanism that attaches the main guard about a hydraulic fluid line such that a detachable junction point of the hydraulic fluid line is housed within and under the main guard and is accessible from below;
wherein the hydraulic fluid line guard comprises a repositioning mechanism for repositioning a distance between the attachment mechanism and the main guard;
wherein the attachment mechanism comprises a clamp;
wherein the clamp comprises two or more movable parts affixed to the arm by one or more shafts;
wherein one of the two or more movable parts is positioned beneath the hydraulic fluid line such that the hydraulic fluid line is positioned between the two or more movable parts; and
wherein the two or more movable parts secure the hydraulic fluid line within the clamp and retain a collar of the detachable junction point.

2. The hydraulic fluid line guard of claim 1, wherein the arm is attached to the enclosed top of the main guard.

3. The hydraulic fluid line guard of claim 1, wherein the main guard is open at both lateral ends.

4. The hydraulic fluid line guard of claim 1, wherein the main guard is about twelve inches long, about six inches in height, and about four and three quarters inches in width.

5. A vehicle, comprising:
an articulating arm that is driven by a hydraulic fluid line;
a main guard formed with an open bottom and enclosed top and sides; and
an attachment mechanism that attaches the main guard about the hydraulic fluid line such that a detachable junction point of the hydraulic fluid line is housed within and under the main guard and accessible from below;
wherein the attachment mechanism attaches to the articulating arm.

6. The vehicle of claim 5, wherein the attachment mechanism includes an arm that permits adjustment of the main guard with respect to a connection point with the articulating arm.

7. The vehicle of claim 5, wherein the attachment mechanism attaches to the hydraulic fluid line.

8. A vehicle, comprising:
an articulating arm that is driven by a hydraulic fluid line;
a main guard formed with an open bottom and enclosed top and sides; and
an attachment mechanism that attaches the main guard about the hydraulic fluid line such that a detachable junction point of the hydraulic fluid line is housed within and under the main guard and accessible from below;
wherein the attachment mechanism attaches to the hydraulic fluid line.

* * * * *